(12) United States Patent
Tang et al.

(10) Patent No.: US 12,398,613 B1
(45) Date of Patent: Aug. 26, 2025

(54) SIDE DOOR BOLT-FREE RAM BLOWOUT PREVENTER

(71) Applicant: RONGSHENG MACHINERY MANUFACTURE LTD. OF HUABEI OILFIELD, HEBEI, Cangzhou (CN)

(72) Inventors: Jianhua Tang, Cangzhou (CN); Hongqi Xu, Cangzhou (CN); Shangwen Su, Cangzhou (CN); Dongliang Jiang, Cangzhou (CN); Weiheng Liao, Cangzhou (CN); Zhiming Qu, Cangzhou (CN); Zhaochun Meng, Cangzhou (CN); Hongjie Wang, Cangzhou (CN); Haohao Li, Cangzhou (CN); Xue Guo, Cangzhou (CN); Wei Wang, Cangzhou (CN)

(73) Assignee: RONGSHENG MACHINERY MANUFACTURE LTD. OF HUABEI OILFIELD, HEBEI, Cangzhou (CN)

( * ) Notice: Subject to any disclaimer, the term of this patent is extended or adjusted under 35 U.S.C. 154(b) by 0 days.

(21) Appl. No.: 19/110,958

(22) PCT Filed: Sep. 13, 2023

(86) PCT No.: PCT/CN2023/118467
§ 371 (c)(1),
(2) Date: Mar. 12, 2025

(87) PCT Pub. No.: WO2024/055977
PCT Pub. Date: Mar. 21, 2024

(30) Foreign Application Priority Data

Sep. 15, 2022 (CN) .......................... 202211124922.4

(51) Int. Cl.
*E21B 33/06* (2006.01)

(52) U.S. Cl.
CPC .................................. *E21B 33/062* (2013.01)

(58) Field of Classification Search
CPC ..... E21B 33/061; E21B 33/062; E21B 33/063
(Continued)

(56) References Cited

U.S. PATENT DOCUMENTS 5,897,094 A     4/1999   Brugman et al.
9,169,710 B2 * 10/2015   Jahnke .................... E21B 33/03
(Continued)

FOREIGN PATENT DOCUMENTS

| CN | 104712285 A | 6/2015 |
|----|-------------|--------|
| CN | 108442900 A | 8/2018 |

(Continued)

OTHER PUBLICATIONS

NO 347072 B1, 2023, Machine Translation (Year: 2023).*
(Continued)

*Primary Examiner* — Daphne M Barry
(74) *Attorney, Agent, or Firm* — Hemisphere Law, PLLC; Zhigang Ma

(57) ABSTRACT

A side-door-bolt-free ram blowout preventer includes first fixed blocks on two side-faces of a housing, and guide rods fixed to sides of the housing; side doors sleeved over outsides of and movable along the guide rods; second fixed blocks provided on the side doors' sides close to the housing; claw blocks arranged at side-faces of the second fixed blocks. Each claw block has a side-face, close to the housing, provided with a waist-shaped hole arranged extending through the claw block, and a side, away from the second fixed block, connected with a claw-block bolt; claw-block beams each penetrate through and have two ends outside corresponding waist-shaped hole; claw-block-beam grooves are formed at corresponding positions on the housing and the side doors; the claw-block beam has two ends (Continued)

inserted into the housing's and side door's claw-block-beam grooves respectively, and an end portion fixed in the claw-block-beam groove on the side door.

11 Claims, 3 Drawing Sheets

(58) Field of Classification Search
USPC .......................................................... 251/1.3
See application file for complete search history.

(56) References Cited

U.S. PATENT DOCUMENTS

| | | | |
|---|---|---|---|
| 9,169,712 B2 * | 10/2015 | Jahnke | ................... E21B 33/061 |
| 9,169,713 B2 * | 10/2015 | Jahnke | ................... E21B 33/062 |
| 9,175,541 B2 * | 11/2015 | Jahnke | .................... E21B 33/06 |

FOREIGN PATENT DOCUMENTS

| | | | | |
|---|---|---|---|---|
| CN | 110080711 A | 8/2019 | | |
| CN | 210049861 A | 2/2020 | | |
| CN | 115573678 | 1/2023 | | |
| CN | 219139021 | 6/2023 | | |
| NO | 347072 B1 * | 5/2023 | ............. | E21B 23/00 |

OTHER PUBLICATIONS

Cn110080711a, Tang, Machine Translation (Year: 2019).*
ISR of PCT/CN2023/118467.
Written Opinion of PCT/CN2023/118467.

* cited by examiner

SIDE DOOR BOLT-FREE RAM BLOWOUT PREVENTER

TECHNICAL FIELD

The present disclosure relates to the technical field of blowout preventers, and more particularly to a ram blowout preventer without side door bolts (i.e., side door bolt-free ram blowout preventer).

BACKGROUND ART

The ram blowout preventer is an important wellhead safety device in drilling and well repair operations. During the drilling and well repair processes, when the drilling tools in the well change, the ram specifications need to be replaced to match the drilling tools in the well. At this time, it is required to open the side door of the blowout preventer on site and then close the side door after the ram is replaced. The blowout preventer is usually connected with the side door through a group of bolts. The side door bolts of the large-diameter high-pressure-level blowout preventer are very heavy, making it very difficult to disassemble and assemble the bolts on site. The workers have high labor intensity, long time consumption, and a harsh working environment, which is prone to safety accidents.

In order to solve the problem of difficulty in disassembling and assembling the side door bolts, some new structures have appeared for the side door connection of the ram blowout preventer. The new structure adopts a bolt-less connection manner, mainly including several common structures of such as rotation pin type, latch type, tooth plate type, etc. At present, these new structures also have the following prominent problems: first, these connection manners need to use the mutually matching surfaces of the housing and the side door to replace the bolt to bear force, which leads to greatly increased structural size and weight, and the increase in the weight of the blowout preventer increases the manufacturing cost, and accordingly increases difficulty in the transportation, installation and user maintenance of the blowout preventer; and second, the structure is complicated, such that when the side door is opened, foreign matters such as rock fragments in the drilling fluid may easily enter the meshing mechanism and are difficult to clean, thereby causing new faults.

Therefore, a problem that needs to be solved urgently by those skilled in the art is to develop a ram blowout preventer without side door bolts that is simple to operate and can be opened and closed quickly.

SUMMARY

In view of this, the present disclosure provides a ram blowout preventer without side door bolts, which is simple to operate and can be opened and closed quickly.

In order to achieve the above object, the present disclosure adopts the following technical solutions.

A ram blowout preventer without side door bolts includes:
a housing, where two side surfaces of the housing are each provided with a first fixed block, and side surfaces of the first fixed blocks are inclined;
side doors, where the side doors are provided at two side surfaces of the housing, guide rods are fixed to sides of the housing connected to the side doors, the side doors are each sleeved over the outsides of the corresponding guide rods and configured to move along the corresponding guide rods; one side of each of the side doors close to the housing is provided with a second fixed block, and the second fixed block has inclined side surfaces and has same shape as the first fixed block;
claw blocks, where a plurality of claw blocks are provided, and the claw blocks are placed between the housing and the side doors, and are arranged at the side surfaces of the second fixed blocks, a side surface of each of the claw blocks which is close to the housing is provided with a waist-shaped hole, and the waist-shaped hole is arranged in the length direction of the guide rod and extends through the claw block; and
claw block beams, where the claw block beams each penetrate through the corresponding waist-shaped hole, and the two ends of the claw block beam are placed outside the corresponding waist-shaped hole, the housing and the side doors are provided with claw block beam grooves at positions corresponding to the claw block beams, and the two ends of each of the claw block beams are respectively inserted into the corresponding claw block beam grooves of the housing and the side door, an end portion of the claw block beam is fixed in the corresponding claw block beam groove of the side door, one side of the claw block away from the second fixed block is provided with a claw block bolt, and the claw block bolt extends into the interior of the claw block and is fixedly connected to the claw block beam.

The beneficial effects of above technical solutions are as follows. In the present application, by making the claw block beams connected at the side door, the side door is first in contact with the housing when closing the side door and the housing, and then the claw blocks are fixed by the claw block bolts; and when the side door needs to be opened, just the claw block bolts need to be screwed outwards, such that the opening and closing operations of the side door may be performed conveniently and quickly, enabling simple, fast and efficient operation.

Preferably, the first fixed block and the second fixed block are each parallelogram-shaped and symmetrically distributed along the horizontal plane where the center line of the housing is located. The first fixed block and the second fixed block have consistent shapes and sizes, which can ensure that the claw blocks can accurately tighten and fix the side surfaces of the first fixed block and the second fixed block.

Preferably, the side surfaces of the first fixed block and the second fixed block are each provided with a first tooth groove, and the side of the claw block in contact with the first tooth grooves is provided with second tooth grooves, and the first tooth grooves and the second tooth grooves are meshed with each other. The first tooth grooves and the second tooth grooves can not only enable the claw block to better fix the side door and the housing, but also prevent the accumulation of drilling fluid and rock fragments, thereby improving the use reliability of the blowout preventer.

Preferably, two side surfaces of the claw block provided with the waist-shaped hole are each provided with a lug, the side door and the housing are provided with lug grooves at positions thereof corresponding to the lugs, and the lugs are placed in the lug grooves. When the side door and the housing are closed, the lugs play a role of connecting and limiting the side door and the housing.

Preferably, a protrusion is provided at the position where the claw block beam is connected to the claw block bolt, the protrusion is embedded in the surface of the claw block beam, and the end surface of the protrusion connected to the claw block bolt is a plane, and the claw block bolt is threadedly connected to the protrusion.

Preferably, the outer surface of the claw block bolt is provided with a flange, and a bolt washer is provided on the side of the flange close to the claw block beam, and the bolt washer abuts between the flange and the claw block. The bolt washer acts as a force transmission component between the claw block and the claw block bolt and fills the middle hole of the claw block, so that the rotational friction resistance can be reduced when rotating claw block bolt to drive the claw block to move inwards.

Preferably, a retaining ring is fixed in the hole of the claw block connected to the claw block bolt, the retaining ring is located on the side of the flange away from the claw block beam, and a bolt retaining ring is provided between the retaining ring and the flange. When the claw block bolt is rotated reversely to cause the claw block to move outwards, the retaining ring is fixed in the hole of the claw block as a force transmission component, and the bolt retaining ring is used as an intermediate component to separate the claw block bolt from the retaining ring, which can reduce the friction resistance when the claw block bolt is rotated.

Preferably, the width of the cross section of the waist-shaped hole is equal to the width of the cross section of the claw block beam, so as to facilitate the horizontal movement of the claw block beam in the waist-shaped hole and prevent the claw block beam from rotating in the waist-shaped hole.

It can be seen from the above technical solution that compared with the prior art, the present disclosure discloses a ram blowout preventer without side door bolts, which has the following beneficial effects:
(1) the side door can be opened and closed quickly by providing the claw blocks, enabling simple, fast and efficient operation;
(2) the side door and the housing are fixed by claw blocks to achieve a compact structure, facilitating transportation, installation and use of the blowout preventer; and
(3) the first tooth groove and the second tooth groove are provided inclinedly to prevent the accumulation of drilling fluid and rock fragments, enabling higher mechanism reliability.

BRIEF DESCRIPTION OF DRAWINGS

In order to more clearly illustrate technical solutions in the embodiments of the present disclosure or in the prior art, the drawings required for use in describing the embodiments or the prior art will be briefly introduced below. Obviously, the drawings described below are only embodiments of the present disclosure. For a person having ordinary skill in the art, other drawings may be obtained based on the provided drawings without paying creative work.

Figure 1:
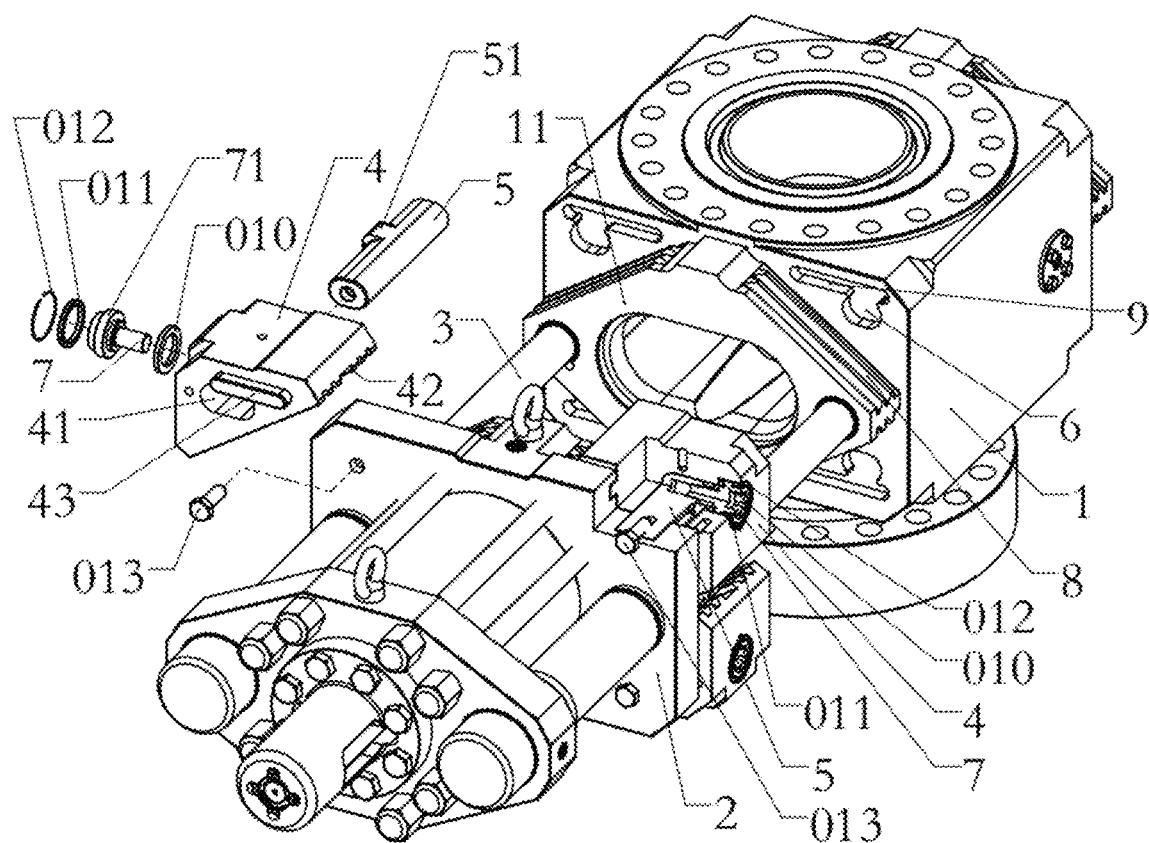
FIG. 1 is a structural exploded view of a blowout preventer provided by the present disclosure from one angle, when the side door is in an open state.
Figure 2:
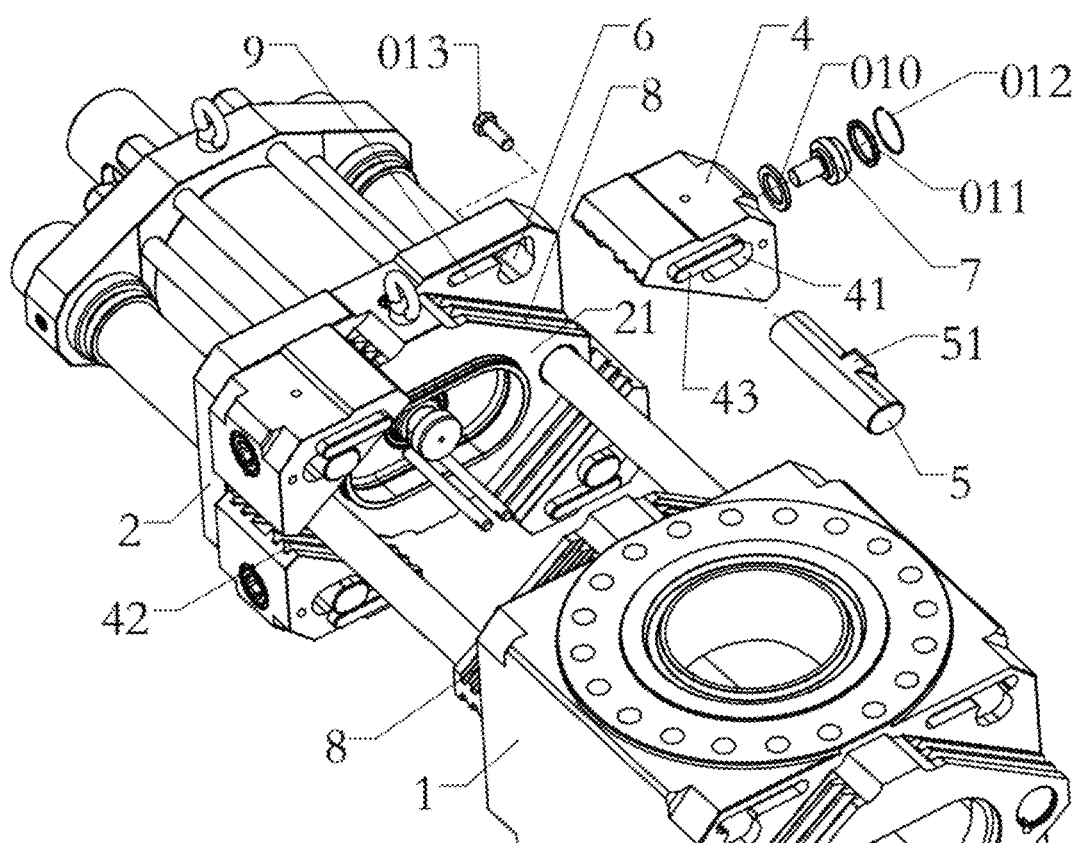
FIG. 2 is a structural exploded view of the blowout preventer provided by the present disclosure from another angle, when the side door is in an open state.
Figure 3:
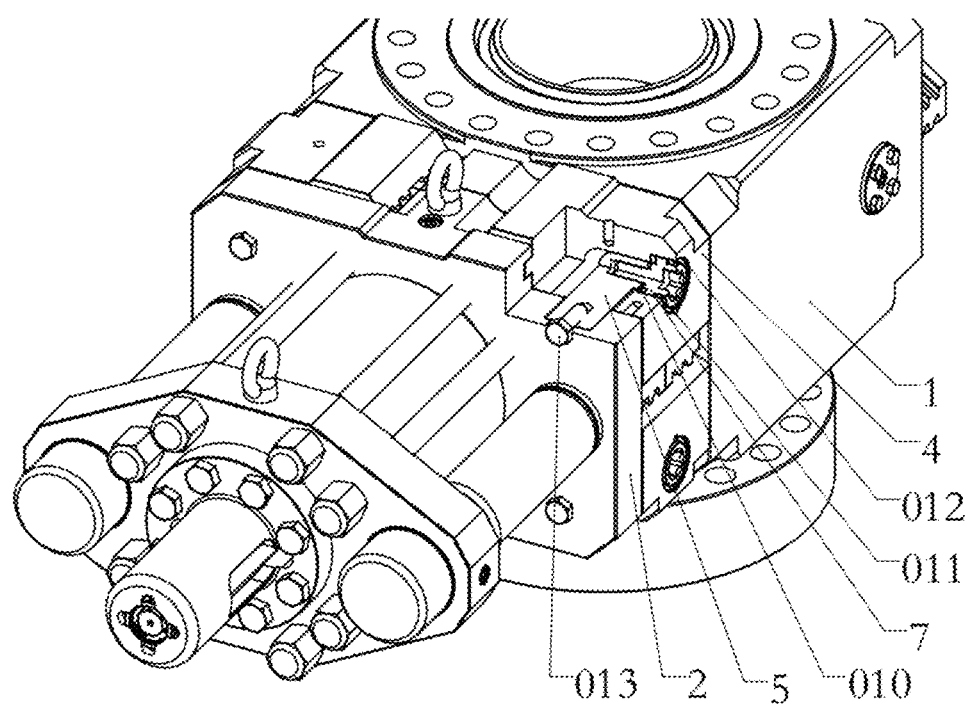
FIG. 3 is a structural schematic view of the blowout preventer provided by the present disclosure, when the side door is in a closed state.

In the above, in the drawings,
1—housing;
11—first fixed block;
2—side door;
21—second fixed block;
3—guide rod;
4—claw block;
41—waist-shaped hole; 42—second tooth groove; 43—lug;
5—claw block beam;
51—protrusion;
6—claw block beam groove;
7—claw block bolt;
71—flange;
8—first tooth groove; 9—lug groove; 010—bolt washer; 011—bolt retaining ring; 012—retaining ring; 013—screw.

DETAILED DESCRIPTION OF EMBODIMENTS

The technical solutions in the embodiments of the present disclosure will be described clearly and completely below in conjunction with the drawings in the embodiments of the present disclosure. Obviously, the described embodiments are only some, not all of the embodiments of the present disclosure. Based on the embodiments of the present disclosure, all other embodiments obtained by a person having ordinary skill in the art without creative work fall within the scope of protection of the present disclosure.

The embodiments of the present disclosure disclose a ram blowout preventer without side door bolts, including:
a housing 1, where two side surfaces of the housing 1 are each provided with a first fixed block 11, and the first fixed block 11 has inclined side surfaces;
side doors 2, where the side doors 2 are provided on the two side surfaces of housing 1, guide rods 3 are fixed to the sides of the housing 1 connected with the side doors 2, the side door 2 is sleeved over the outsides of corresponding guide rods 3 and moves along the guide rods 3; the side of each side door 2 close to the housing 1 is provided with a second fixed block 21; and the second fixed block 21 has inclined side surfaces and has the same shape as first fixed block 11;
claw blocks 4, where a plurality of claw blocks 4 are provided, the claw blocks 4 are placed between the side door 2 and the housing 1 and arranged at the side surfaces of the second fixed block 21; the side surface of each claw block 4 close to the housing 1 is provided with a waist-shaped hole 41, and the waist-shaped hole 41 is arranged in the length direction of the guide rod 3 and extends through the claw block 4; and
claw block beams 5, where the claw block beams 5 penetrate through the waist-shaped holes 41, and the two ends of the claw block beam 5 are placed outside the waist-shaped hole 41; the housing 1 and the side doors 2 are provided with claw block beam grooves 6 at positions corresponding to the claw block beams 5, and the two ends of the claw block beam 5 are respectively inserted into the corresponding claw block beam grooves 6 of the housing 1 and the side door 2, and the end portion of the claw block beam 5 is fixed in the corresponding claw block beam groove 6 of the side door 2; one side of the claw block 4 away from the second fixed block 21 is connected to a claw block bolt 7, and the claw block bolt 7 extends into the interior of the claw block 4 and is fixedly connected to the claw block beam 5. The claw block bolt 7 may limit the position of the claw block beam 5 in the waist-shaped hole 41, so that the claw block beam 5 can tightly lock the side door 2.

In order to further optimize the above technical solution, the first fixed block 11 and the second fixed block 21 are each parallelogram-shaped and symmetrically distributed along the horizontal plane where the center line of the housing 1 is located.

In order to further optimize the above technical solution, the side surfaces of the first fixed block 11 and the second fixed block 21 are each provided with a first tooth groove 8, and the side of the claw block 4 in contact with the first tooth grooves 8 is provided with second tooth grooves 42, and the first tooth grooves 8 are meshed with the second tooth grooves 42. When the side door 2 is closed, the second tooth grooves 42 of the claw block 4 are meshed with both first tooth grooves 8 on the side surfaces of the first fixed block 11 and the second fixed block 21.

In order to further optimize the above technical solution, two side surfaces of the claw block 4 provided with the waist-shaped hole 41 are each provided with a lug 43, and the side door 2 and the housing 1 are provided with lug grooves 9 at positions corresponding to the lugs 43, and the lugs 43 are placed in the lug grooves 9.

In order to further optimize the above technical solution, a protrusion 51 is provided at the position where the claw block beam 5 is connected to the claw block bolt 7. The protrusion 51 is embedded in the surface of the claw block beam 5, and the end surface of the protrusion 51 connected to the claw block bolt 7 is a plane, and the claw block bolt 7 is threadedly connected to the protrusion 51.

In order to further optimize the above technical solution, the outer surface of the claw block bolt 7 is provided with a flange 71, one side of the flange 71 close to the claw block beam 5 is provided with a bolt washer 010, and the bolt washer 010 abuts between the flange 71 and the claw block 4.

In order to further optimize the above technical solution, a retaining ring 012 is fixed in the hole of the claw block 4 connected to the claw block bolt 7. The retaining ring 012 is located on the side of the flange 71 away from the claw block beam 5, and a bolt retaining ring 011 is provided between the retaining ring 012 and the flange. When the side door 2 is opened, the claw block bolt 7 is rotated reversely, and due to the blocking effect of the retaining ring 012 on the flange 71, the claw block bolt 7 may drive the claw block 4 to move outwards together until the locking of the claw block 4 on the side door 2 and the housing 1 is completely released.

In order to further optimize the above technical solution, the width of the cross section of the waist-shaped hole 41 is equal to the width of the cross section of the claw block beam 5. The size of the waist-shaped hole 41 is larger than the size of the claw block beam 5, which can ensure that the claw block beam 5 may move in the waist-shaped hole 41 when the side door 2 is attached to the housing 1.

In order to further optimize the above technical solution, one end of the claw block beam 5 close to the side door 2 is fixed to the side door 2 by a screw 013, and the screw 013 is inserted from the surface of the side door 2 into the interior of the claw block beam 5 for fixing.

Working process:

When needing to open the side door 2, the claw block bolts 7 are screwed outwards, and each claw block bolt 7 pushes the corresponding claw block 4 to move horizontally outwards through the corresponding bolt retaining ring 011 and the corresponding retaining ring 012 until the waist-shaped hole 41 of the claw block 4 contacts the corresponding claw block beam 5. At this time, the second tooth grooves 42 of the claw block 4 are completely separated from the first tooth grooves 8 of the side door and the housing; and at this time, the hydraulic pressure may be operated to open the side door 2 to complete the operation of replacing the ram; and When closing the side door, the hydraulic pressure is operated to close the side door 2. At this time, the side door 2 and the housing 1 are in an attachment state; and the claw block bolts 7 are screwed inwards. Each claw block bolt 7 pushes the corresponding claw block 4 to move horizontally inwards through the corresponding bolt washer 010 until the second tooth grooves 42 of the claw block 4 are meshed with the first tooth grooves 8 of the side door and the housing. At this time, the closing operation of the side door 2 is completed, and the normal working state of the blowout preventer restores.

Various embodiments in this specification are described in a progressive manner, and each embodiment focuses on the differences from other embodiments. The same or similar parts between the various embodiments may be referred to each other.

The above description of the disclosed embodiments enables one skilled in the art to implement or use the present disclosure. Various modifications to these embodiments will be obvious to one skilled in the art, and the general principles defined herein may be implemented in other embodiments without departing from the spirit or scope of the present disclosure. Therefore, the present disclosure will not be limited to the embodiments shown herein, but rather to the widest scope consistent with the principles and novel features disclosed herein.

What is claimed is:

1. A ram blowout preventer without side door bolts, comprising:
   a housing, wherein two side surfaces of the housing are each provided with a first fixed block, and the first fixed block has inclined side surfaces;
   side doors, wherein the side doors are provided on the two side surfaces of the housing, guide rods are fixed to sides of the housing connected to the side doors; the side doors are each sleeved over outsides of corresponding guide rods and configured to move along the corresponding guide rods, one side of each of the side doors which is close to the housing is provided with a second fixed block, and the second fixed block has inclined side surfaces, and has same shape as the first fixed block;
   claw blocks, wherein a plurality of claw blocks are provided, the claw blocks are provided between the housing and the side doors, and are arranged on the side surfaces of the second fixed blocks, a side surface of each of the claw blocks which is close to the housing is provided with a waist-shaped hole, and the waist-shaped hole is arranged in a length direction of the corresponding guide rod and extends through the claw block; and
   claw block beams, wherein the claw block beams are each penetrate through the corresponding waist-shaped hole, and two ends of each of the claw block beams are placed outside the corresponding waist-shaped hole, the housing and the side doors are provided with claw block beam grooves at positions thereof corresponding to the claw block beams, the two ends of the claw block beam are respectively inserted into the claw block beam grooves of the housing and the corresponding side door, an end portion of the claw block beam is fixed in the corresponding claw block beam groove of the corresponding side door, one side of each of the claw blocks away from the second fixed block is connected with a claw block bolt, and the claw block bolt extends into an interior of the claw block and is fixedly connected to the claw block beam.

2. The ram blowout preventer without side door bolts according to claim 1, wherein the first fixed block and the second fixed block are each parallelogram-shaped and symmetrically distributed along a horizontal plane where a center line of the housing is located.

3. The ram blowout preventer without side door bolts according to claim 2, wherein side surfaces of the first fixed block and the second fixed block are each provided with a first tooth groove, one side of each of the claw blocks in contact with the first tooth grooves is provided with second tooth grooves, and the first tooth grooves are meshed with the second tooth grooves.

4. The ram blowout preventer without side door bolts according to claim 2, wherein a protrusion is provided at a position where the claw block beam is connected to the claw block bolt, the protrusion is embedded in a surface of the claw block beam, an end surface of the protrusion connected to the claw block bolt is a plane, and the claw block bolt is threadedly connected to the protrusion.

5. The ram blowout preventer without side door bolts according to claim 1, wherein side surfaces of the first fixed block and the second fixed block are each provided with a first tooth groove, one side of each of the claw blocks in contact with the first tooth grooves is provided with second tooth grooves, and the first tooth grooves are meshed with the second tooth grooves.

6. The ram blowout preventer without side door bolts according to claim 5, wherein two side surfaces of the claw block with the waist-shaped hole are each provided with a lug, the side doors and the housing are provided with lug grooves at positions thereof corresponding to the lugs, and the lugs are placed in the lug grooves.

7. The ram blowout preventer without side door bolts according to claim 6, wherein a protrusion is provided at a position where the claw block beam is connected to the claw block bolt, the protrusion is embedded in a surface of the claw block beam, an end surface of the protrusion connected to the claw block bolt is a plane, and the claw block bolt is threadedly connected to the protrusion.

8. The ram blowout preventer without side door bolts according to claim 1, wherein a protrusion is provided at a position where the claw block beam is connected to the claw block bolt, the protrusion is embedded in a surface of the claw block beam, an end surface of the protrusion connected to the claw block bolt is a plane, and the claw block bolt is threadedly connected to the protrusion.

9. The ram blowout preventer without side door bolts according to claim 8, wherein an outer surface of the claw block bolt is provided with a flange, one side of the flange close to the claw block beam is provided with a bolt washer, and the bolt washer abuts between the flange and the claw block.

10. The ram blowout preventer without side door bolts according to claim 9, wherein a retaining ring is fixed in a hole of the claw block connected to the claw block bolt, the retaining ring is located on one side of the flange away from the claw block beam, and a bolt retaining ring is provided between the retaining ring and the flange.

11. The ram blowout preventer without side door bolts according to claim 1, wherein a width of a cross section of the waist-shaped hole is equal to a width of a cross section of the claw block beam.

* * * * *